US011613395B2

(12) United States Patent
Subramanian et al.

(10) Patent No.: US 11,613,395 B2
(45) Date of Patent: Mar. 28, 2023

(54) TOUCH-LESS PRINTING OF TRAVEL DETAILS ON TRAVEL BAG

(71) Applicant: Rockwell Collins, Inc., Cedar Rapids, IA (US)

(72) Inventors: Sanith Kurumpilavu Subramanian, Bangalore (IN); Chandana Rao, Mangalore (IN)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 17/323,410

(22) Filed: May 18, 2021

(65) Prior Publication Data
US 2022/0185525 A1 Jun. 16, 2022

(30) Foreign Application Priority Data

Dec. 10, 2020 (IN) .............................. 202041053774

(51) Int. Cl.
*B32B 41/00* (2006.01)
*B65C 9/02* (2006.01)
(Continued)

(52) U.S. Cl.
CPC .............. *B65C 9/02* (2013.01); *B41J 3/4073* (2013.01); *B65C 9/18* (2013.01); *B65C 9/40* (2013.01); *B65G 47/48* (2013.01); *G06Q 10/08* (2013.01)

(58) Field of Classification Search
CPC ..... B65C 9/02; B65C 9/18; B65C 9/40; B41J 3/4073; B65G 47/48; G06Q 10/08; B64F 1/368; B64F 1/366
(Continued)

(56) References Cited

U.S. PATENT DOCUMENTS 3,752,312 A 8/1973 Soltanoff
2007/0109127 A1 5/2007 Johnson et al.
(Continued)

FOREIGN PATENT DOCUMENTS

CN 109850302 A 6/2019
EP 3220329 A1 9/2017
(Continued)

OTHER PUBLICATIONS

Silkscreen Holland, "Scratching is History", URL: https://www.silk-screen.nl/en/products/special-effect-inks/peel-ink, Downloaded Oct. 26, 2020, 3 pages.
(Continued)

*Primary Examiner* — Michael N Orlando
*Assistant Examiner* — Joshel Rivera
(74) *Attorney, Agent, or Firm* — Suiter Swantz pc llo

(57) ABSTRACT

A baggage labeling system is disclosed. The baggage labeling system includes a baggage labeling module. The baggage labeling module includes a housing, a workstation interface, a controller communicatively coupled to the workstation interface. a baggage sensor communicatively coupled to the controller, a conveyor system communicatively coupled to the controller and configured to move a baggage item. The baggage labeling module includes a printing assembly communicatively coupled to the controller. The printing assembly includes a printer head configured to print a label directly onto the baggage item and a positioning arm mechanically coupled to the printer head configured to rotate the positioning arm relative to at least one plane, or translate the positioning arm relative to a first axis. The baggage labeling system further includes a workstation communicatively coupled to the baggage labeling module.

18 Claims, 13 Drawing Sheets

(51) Int. Cl.
    *B41J 3/407*     (2006.01)
    *B65C 9/18*     (2006.01)
    *B65C 9/40*     (2006.01)
    *B65G 47/48*     (2006.01)
    *G06Q 10/08*     (2023.01)

(58) Field of Classification Search
    USPC .................. 156/60, 64, 350, 351, 378, 379
    See application file for complete search history.

(56) References Cited

U.S. PATENT DOCUMENTS

| | | | |
|---|---|---|---|
| 2014/0002239 A1* | 1/2014 | Rayner | G08B 13/2462 |
| | | | 340/5.61 |
| 2016/0052659 A1* | 2/2016 | Bowers | B65C 9/40 |
| | | | 156/64 |

FOREIGN PATENT DOCUMENTS

| | | | | |
|---|---|---|---|---|
| JP | 2000255715 A | | 9/2000 | |
| JP | 2000262985 A | | 9/2000 | |
| JP | 2009226606 A | * | 10/2009 | ........ B41M 5/38214 |
| WO | 2007059049 A2 | | 5/2007 | |
| WO | 2012012841 A1 | | 2/2012 | |
| WO | 2013151436 A2 | | 10/2013 | |
| WO | 2020035626 A1 | | 2/2020 | |
| WO | 2020165705 A1 | | 8/2020 | |

OTHER PUBLICATIONS

Extended Search Report in European Application No. 21213264.1 dated Apr. 19, 2022, 5 pages.

* cited by examiner

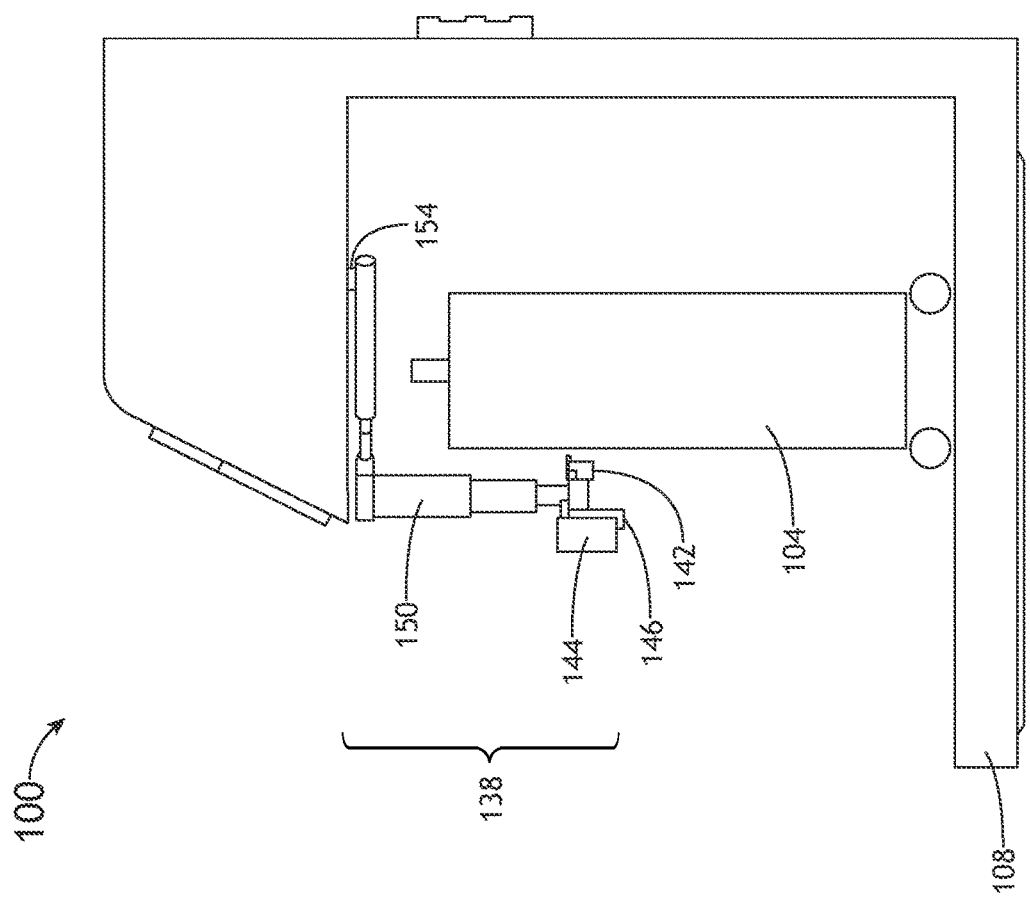

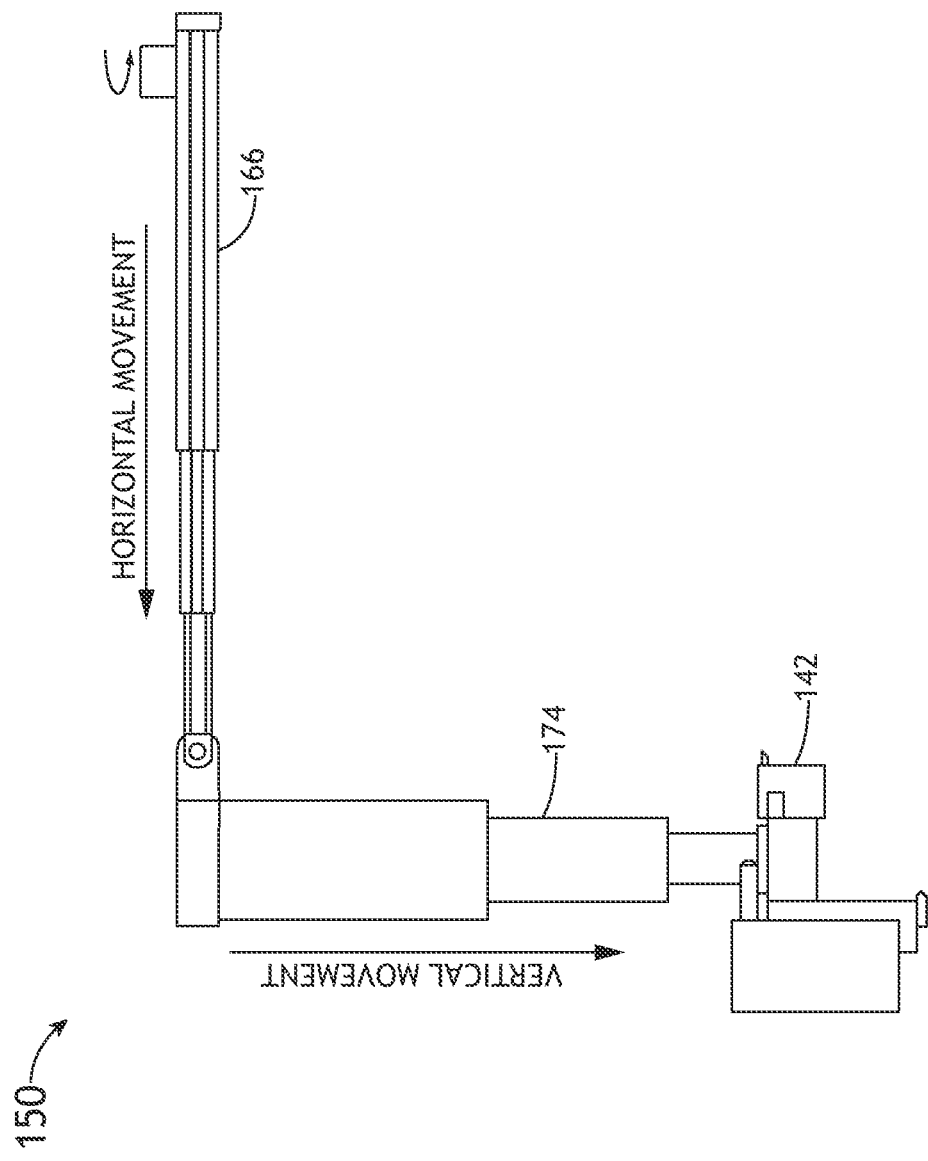

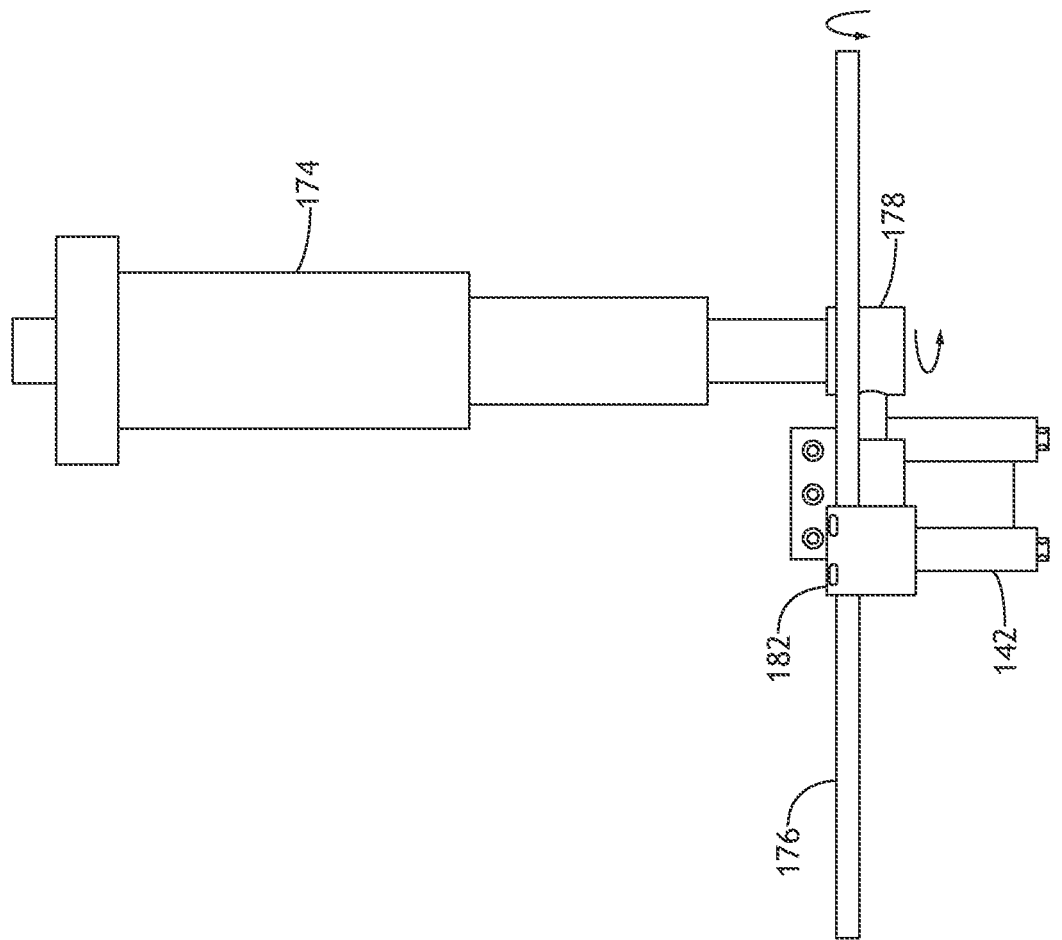

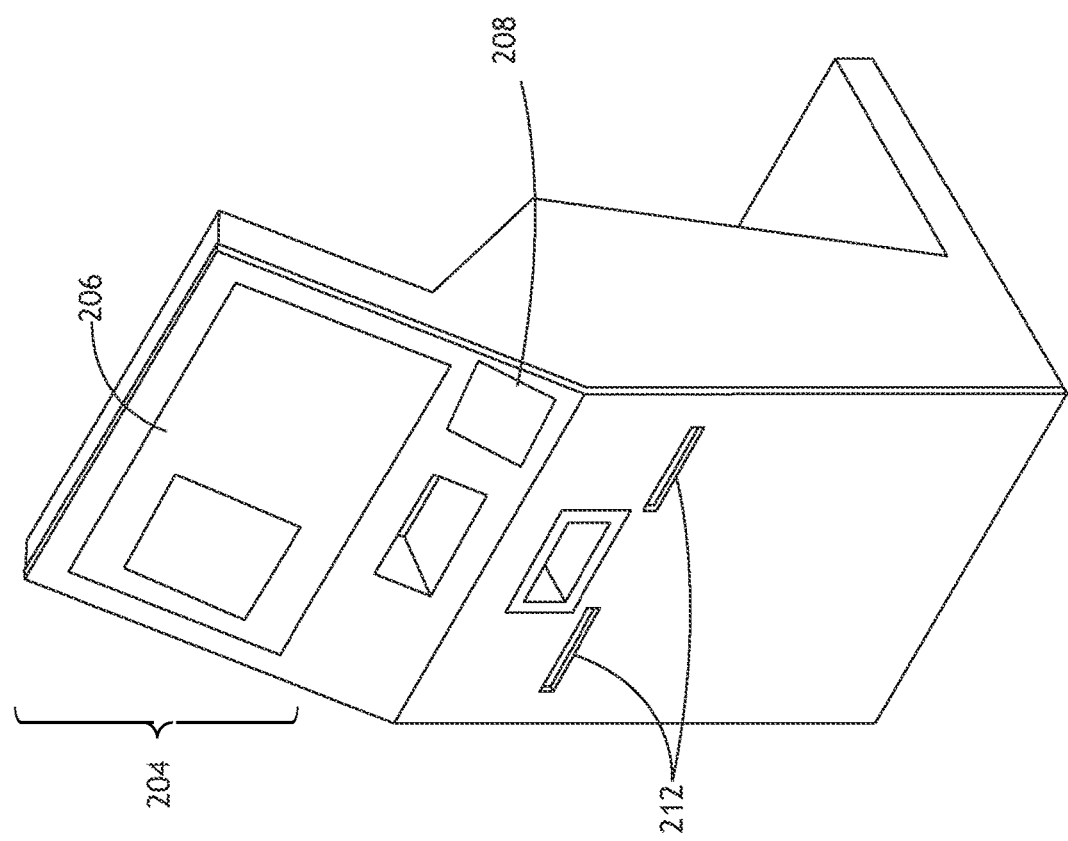

TOUCH-LESS PRINTING OF TRAVEL DETAILS ON TRAVEL BAG

BACKGROUND

The present application claims the benefit under 35 U.S.C. § 119(e) of Indian Provisional App. No. 202041053774 (filed Dec. 10, 2020), entitled "TOUCH-LESS PRINTING OF TRAVEL DETAILS ON TRAVEL", which is incorporated herein by reference in its entirety.

Baggage checking systems at airports operate to tag baggage before loading onto aircraft, allowing airport and aircraft crew the ability to identify and track the baggage as it is transported. Baggage tags may be printed off by airport personnel during as the passenger checks in their baggage, and the baggage tag is attached to the baggage. Baggage checking systems have become increasingly automated. For example, baggage checking kiosks allow passengers to print off baggage tags that they can attach to their baggage themselves.

The attachment of a baggage tag to a baggage typically requires physical contact of the passenger or airport personnel with the baggage, which can increase the potential for the spreading of contaminants such as virus and bacteria. For example, a virally infected passenger that has contaminated the handle of a checked suitcase may infect a check-in officer that grabs the handle in order to attach a baggage tag. Additionally, printers that print baggage tags, whether at the Kiosk or behind a service counter, may jam, run out of material (e.g., paper or ink), or may otherwise malfunction. Therefore, it would be advantageous to provide a solution that cures the shortcomings described above.

SUMMARY

A baggage labeling system is disclosed. In one or more embodiments, the baggage labeling system includes a baggage labeling module. In some embodiments, the baggage labeling module includes a housing. In some embodiments, the baggage labeling module includes a workstation interface. In some embodiments, the baggage labeling module includes a controller communicatively coupled to the workstation interface. In some embodiments the baggage labeling module includes a baggage sensor communicatively coupled to the controller. In some embodiments, the baggage labeling module includes a conveyor system communicatively coupled to the controller and configured to move a baggage item. In some embodiments, the conveyor system includes a conveyor belt. In some embodiments, the conveyor system includes a conveyor actuating motor. In some embodiments, the baggage labeling module includes a printing assembly communicatively coupled to the controller. In some embodiments, the printing assembly includes a printer head configured to print a label directly onto the baggage item. In some embodiments, the printing assembly includes a positioning arm mechanically coupled to the printer head. In some embodiments, the printing assembly includes a positioning arm motor mechanically coupled to the positioning arm, wherein the positioning arm is configured to at least one or rotate the positioning arm relative to at least one plane, or translate the positioning arm relative to a first axis.

In some embodiments of the baggage labeling system, the baggage labeling system further includes a workstation communicatively coupled to the baggage labeling module. In some embodiments the workstation includes a display. In some embodiments the workstation includes a user interface. In some embodiments the workstation includes a reader configured to detect and input baggage-related data. In some embodiments, the workstation includes one or more processors communicatively coupled to the workstation interface, the display, the user interface and the reader. In some embodiments, the work station includes a memory coupled to the one or more processors and having instructions stored upon, which when executed by the one or more processors, cause the one or more processors to receive an input from at least one of the user interface or reader. In some embodiments, the instruction, when executed by the one or more processors, cause the one or more processors to send a printing instruction to the baggage labeling module.

In some embodiments of the baggage labeling system, the positioning arm includes a first operating member motor mechanically coupled to the first operating member and communicatively coupled to the controller, wherein the first operating member is configured to move the printer head relative to a second axis.

In some embodiments of the baggage labeling system, the positioning arm includes a second operating member motor mechanically coupled to the second operating member and communicatively coupled to the controller, wherein the second operating member is configured to move the printer head relative to a third axis.

In some embodiments of the baggage labeling system, the optical scanner is mechanically coupled to the printer head.

In some embodiments of the baggage labeling system, the first labeling system further comprises an ink configured to be printed onto the baggage item via the printer head.

In some embodiments of the baggage labeling system, the ink is further configured as a peelable ink.

In some embodiments of the baggage labeling system, the baggage labeling module communicated with the workstation via a wireless technology.

In some embodiments of the baggage labeling system, the baggage labeling system further includes an ultraviolet source configured to sterilize at least a portion of the baggage item.

In some embodiments of the baggage labeling system, the one or more processors are further instructed to determine a labeling surface on the baggage item to print the label.

Another baggage labeling system is also disclosed. In one or more embodiments, the baggage labeling system includes a baggage labeling module. In some embodiments, the baggage labeling module includes a housing. In some embodiments, the baggage labeling module includes a workstation interface. In some embodiments, the baggage labeling module includes a controller communicatively coupled to the workstation interface. In some embodiments the baggage labeling module includes a baggage sensor communicatively coupled to the controller. In some embodiments, the baggage labeling module includes a conveyor system communicatively coupled to the controller and configured to move a baggage item. In some embodiments, the conveyor system includes a conveyor belt. In some embodiments, the conveyor system includes a conveyor actuating motor. In some embodiments, the baggage labeling module includes a printing assembly communicatively coupled to the controller. In some embodiments, the printing assembly includes a printer head configured to print a label directly onto the baggage item. In some embodiments, the printing assembly includes a positioning arm mechanically coupled to the printer head. In some embodiments, the printing assembly includes a positioning arm motor mechanically coupled to the positioning arm, wherein the positioning arm is configured to at least one or rotate the positioning arm relative to at least one plane, or translate the positioning arm relative to a first axis. In some embodiments of the baggage labeling system, the baggage labeling system further includes a workstation communicatively coupled to the baggage labeling module. In some embodiments the workstation includes a display. In some embodiments the workstation includes a user interface. In some embodiments the workstation includes a reader configured to detect and input baggage-related data. In some embodiments, the workstation includes one or more processors communicatively coupled to the workstation interface, the display, the user interface and the reader. In some embodiments, the work station includes a memory coupled to the one or more processors and having instructions stored upon, which when executed by the one or more processors, cause the one or more processors to receive an input from at least one of the user interface or reader. In some embodiments, the instruction, when executed by the one or more processors, cause the one or more processors to send a printing instruction to the baggage labeling module.

In some embodiments of the baggage labeling system, the positioning arm includes a first operating member motor mechanically coupled to the first operating member and communicatively coupled to the controller, wherein the first operating member is configured to move the printer head relative to a second axis.

In some embodiments of the baggage labeling system, the positioning arm includes a second operating member motor mechanically coupled to the second operating member and communicatively coupled to the controller, wherein the second operating member is configured to move the printer head relative to a third axis.

In some embodiments of the baggage labeling system, the optical scanner is mechanically coupled to the printer head.

In some embodiments of the baggage labeling system, the first labeling system further comprises an ink configured to be printed onto the baggage item via the printer head.

In some embodiments of the baggage labeling system, the ink is further configured as a peelable ink.

In some embodiments of the baggage labeling system, the baggage labeling module communicated with the workstation via a wireless technology.

In some embodiments of the baggage labeling system, the baggage labeling system further includes an ultraviolet source configured to sterilize at least a portion of the baggage item.

In some embodiments of the baggage labeling system, the one or more processors are further instructed to determine a labeling surface on the baggage item to print the label.

A method for labeling a baggage item is also disclosed. In some embodiments, the method includes placing the baggage item onto a conveyor system of a baggage labeling system. In some embodiments, the method includes moving the baggage item via the conveyor system into a scanning position. In some embodiments, the method includes scanning the baggage item to identify a labeling surface on the baggage item. In some embodiments, the method includes printing a label onto the labeling surface of the baggage item, wherein the label comprises a removable ink. In some embodiments, the method includes moving the baggage item via the conveyor system away from the scanning position. In some embodiments, the method includes removing the baggage item from the conveyor system.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 1E is a diagram illustrating a side view of a baggage labeling system, in accordance with one or more embodiments of this disclosure;

FIG. 1G is a drawing illustrating the positioning arm, in accordance with one or more embodiments of this disclosure;

FIG. 1H illustrates a printer head mechanically coupled to a second operating member, in accordance with one or more embodiments of this disclosure;

FIG. 2A illustrates a perspective view of a workstation, in accordance with one or more embodiments of this disclosure;

DETAILED DESCRIPTION

Figure 1A:
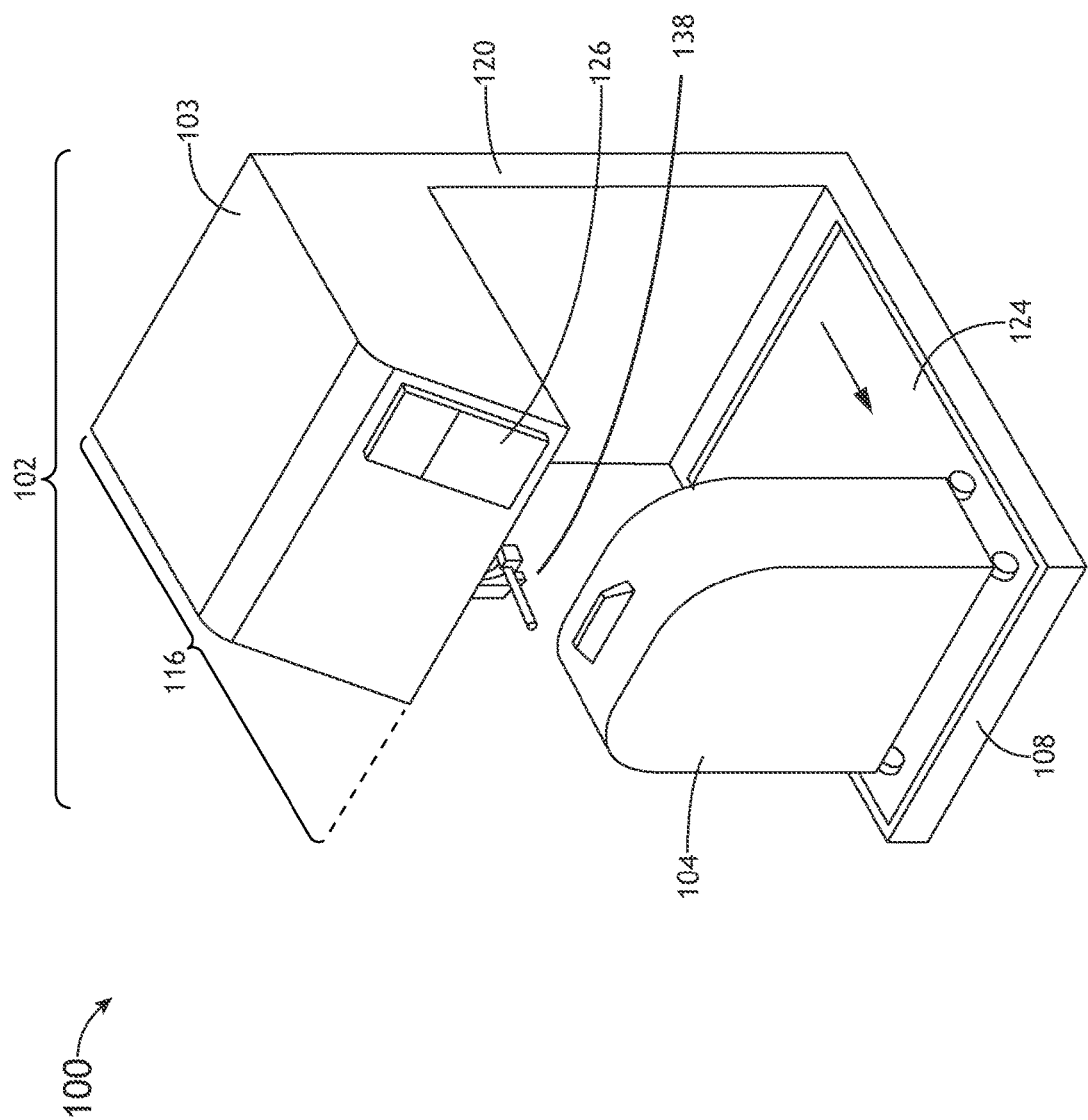
FIG. 1A is a diagram illustrating a perspective view of a baggage labeling system, in accordance with one or more embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

Broadly, the embodiments of this disclosure are directed to a baggage tagging system for use in airports, bus terminals, train terminals, cargo transportation centers, or any cargo/baggage transportation entity. The baggage tagging system includes a scanner and printing assembly that scans baggage for a proper placement to print baggage identification and shipping directions directly onto the surface of the baggage. The ink used by the printing assembly may be a temporary ink that peels off the baggage after the baggage has reached the proper destination. By scanning and printing a baggage identification directly onto the baggage, less input is needed by the traveler or attendant to directly contact the baggage to place a baggage tag onto the baggage item (e.g., the system is substantially touch-less). Reduced contact with baggage in may reduce transmission of diseases by reducing the contamination of attendants and travelers with viruses, bacteria, and other agents. The baggage tagging system may be a stand-alone system or may be an add-on, retrofittable, device that can be coupled to an existing self-service baggage kiosk.

FIG. 1A is a diagram illustrating a perspective view of a baggage labeling system 100, in accordance with one or more embodiments of this disclosure. In some embodiments, the baggage labeling system 100 includes a baggage labeling module 102 configured to receive a baggage item 104 on a base 108. For example, a traveler may place the baggage item 104 on the base 108 in preparation for labeling.

In some embodiments, the baggage labeling module 102 further includes a housing 103. The housing 103 is configured to contain one or more components of the baggage labeling module and may include the base 108. The housing 103 may also be configured to partially or entirely envelop the baggage item 104 during the labeling process. For example, the housing 103 may surround the baggage item on three sides (e.g., the base 108, a top section 116, and a lateral surface 120, as in FIG. 1A). In another example, one or more additional lateral surfaces 120 may enclose the baggage item 104 during the labeling process (e.g., to prevent a passenger or attendant from interrupting the labeling process or from being injured during the labeling process.

Figure 1B:
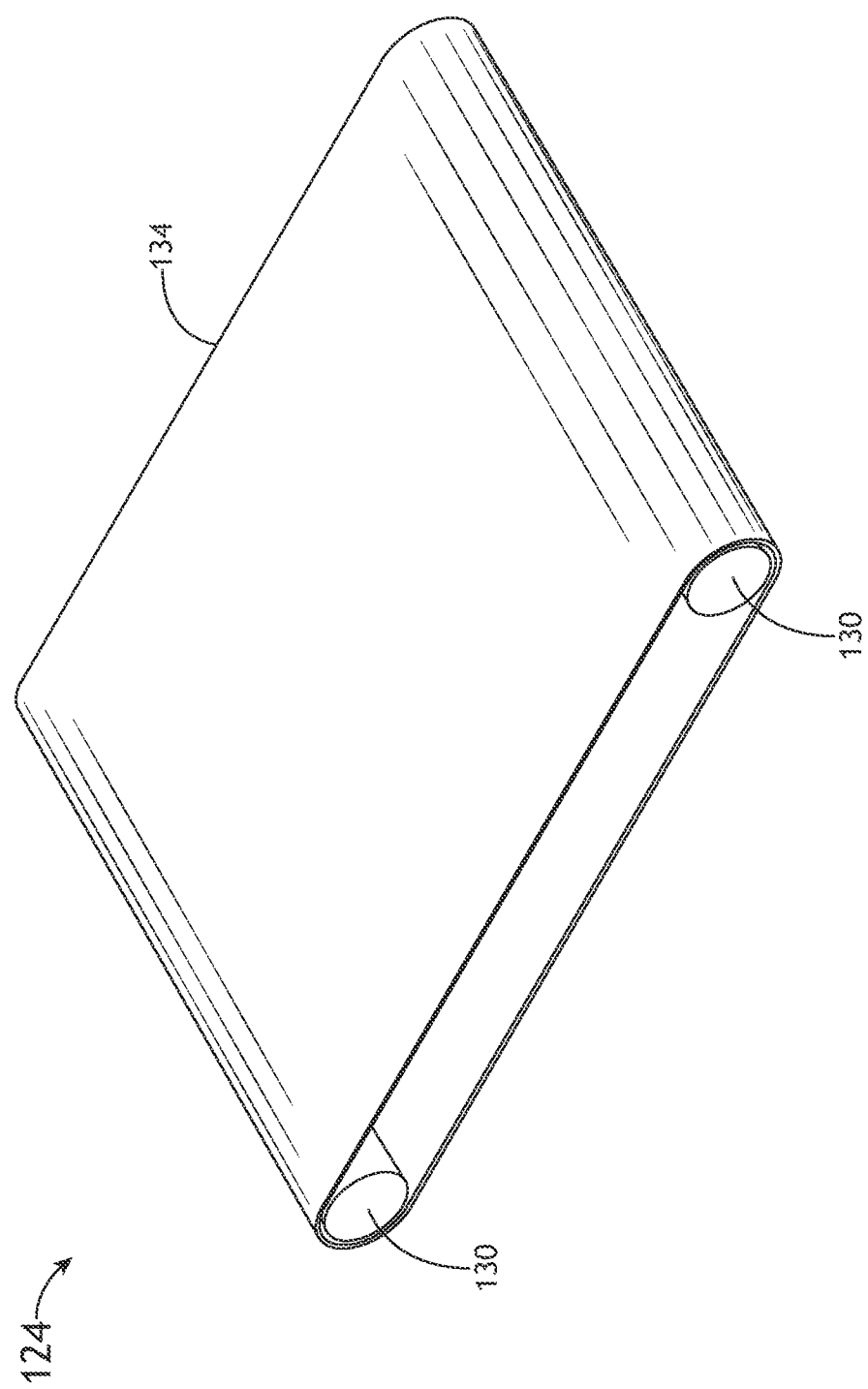
FIG. 1B is a diagram of a conveyor system in, accordance with one or more embodiments of this disclosure.

In some embodiments, the baggage labeling module 102 includes a conveyor system 124 configured to translate the baggage item 104 from a placement position (e.g., the position of the baggage item 104 as it has been deposited onto the base 108 by a traveler or attendant) to a labeling position (e.g., the position of the baggage item 104 as the baggage item 104 is undergoing labeling. The conveyor system 124 may include one or more rollers 130 and one or more conveyor belts 134 common to conveyor systems (e.g., as shown in FIG. 1B. The conveyor system 124 may also include a conveyor actuating motor (not shown) that is mechanically coupled to the one or more rollers 130 and/or the one or more conveyor belts 134. The baggage labeling module 102 may also include an ink level indicator 126 configured to display a message (e.g., a color, a sound, or other indication), when the ink level within the baggage labeling module 102 is low (e.g., the ink status of a printer cartridge). For example, the ink level indicator 126 may display a warning message to an attendant if the printer cartridge is at less than 25% capacity.

Figure 1D:
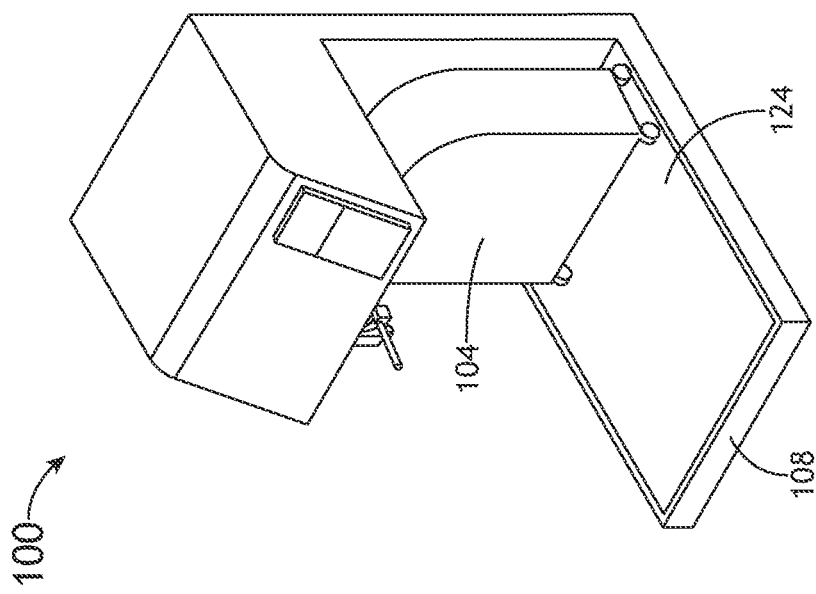
FIG. 1D is a diagram illustrating a translation of a baggage item via a conveyor system, in accordance with one or more embodiments of this disclosure.
Figure 1C:
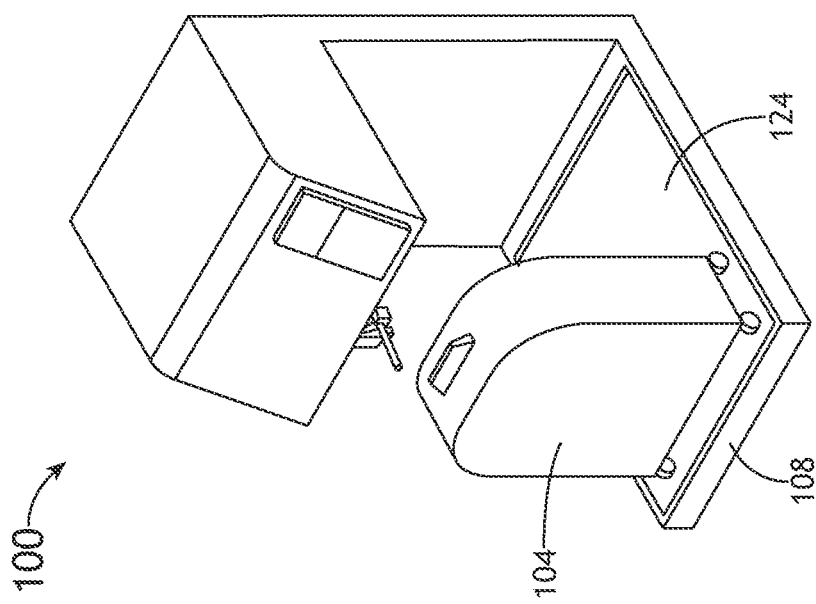
FIG. 1C is a diagram illustrating a translation of a baggage item via a conveyor system, in accordance with one or more embodiments of this disclosure.

FIGS. 1C and 1D are diagrams illustrating a translation of the baggage item 104 via the conveyor system 124. Upon placement of the baggage item onto the base 108 and the conveyor system 124, the conveyor system 124 translates the baggage item 104 form the placement position (e.g., FIG. 1C) to the labeling position (e.g., 1D). After the labeling is performed, the conveyor system 124 reverses, translating the baggage item 104 from the labeling position to the placement position, allowing the passenger or attendant to pick up the baggage item 104.

In some embodiments, the baggage labeling module includes a baggage sensor to determine the position of the baggage item 104 on the conveyor system 124. The baggage sensor may be of any type of scanner or sensor configured to detect a baggage item including but not limited to optical sensors. The baggage sensor may be disposed on the body of the baggage labeling module 102 (e.g., disposed on a surface of the housing 103), The baggage labeling module 102 may also include other sensors and/or methods for determining the presence or position of the baggage item including but not limited to a weighing scale (e.g., a load scale).

In some embodiments, the baggage labeling module 102 includes a printing assembly 138 configured to print a baggage identification label directly onto the baggage item 104. FIG. 1E illustrates a side view of the baggage labeling module 102 configured with the printing assembly 138, in accordance with one or more embodiments of this disclosure. The printing assembly includes a printer head 142 configured to facilitate the deposition of ink onto the surface of the baggage item 104. The printing assembly 138 also includes a print cartridge 144 for storing the ink before it is applied via the printer head 142. The printing assembly 138 may be communicatively linked to the ink level indicator 126. The printing assembly may also include an optical scanner 146 configured to scan the baggage item 104 for an area acceptable for labeling by the printer head. For example, the optical scanner 146 may incorporate image processing methodology to scan the baggage surface and based on this data provided, one or more processor 308 determines the surface to be printed. The printing assembly also includes a positioning arm 150 coupled to the assembly head and a positioning arm motor (not shown). The positioning arm 150 is configured to reposition the optical scanner relative to the baggage item 104 while the baggage item 104 is being scanned. The positioning arm 150 is also configured to reposition the printer head 142 during the printing process. The positioning arm 150 may move in any type of direction. For example, the positioning arm 150 may be configured to rotate around a vertical axis 154 (e.g., a first axis, as in FIG. 1E) along a plane. In this configuration, the optical scanner may be able to scan a substantial portion of the lateral sides of the baggage item 104 as the optical scanner rotates around the baggage item 104. Accordingly, the printer head 142 may also be able to print a label at near any point on the lateral sides of the baggage item 104 as the printer head 142 rotates around the baggage item 104.

In some embodiments, the positioning arm 150 may be configured to translate or articulate between positions (e.g., the positioning arm 150 may not be configured to rotate around the vertical axis). For example, the positioning arm 150 may translate along a first single axis. For instance, the positioning arm 150 may be configured to translate the optical scanner 146 and the printer head 142 in a single axis above the baggage item 104, wherein the printer head 142 prints a label on the top of the baggage item. In another example, the positioning arm may be configured to articulate in two axes (e.g., an X axis and Y axis) along a single plane. In still another example, the positioning arm 150 may be configured as an articulating robotic arm capable of an infinite number of positions for scanning and printing.

Figure 1F:
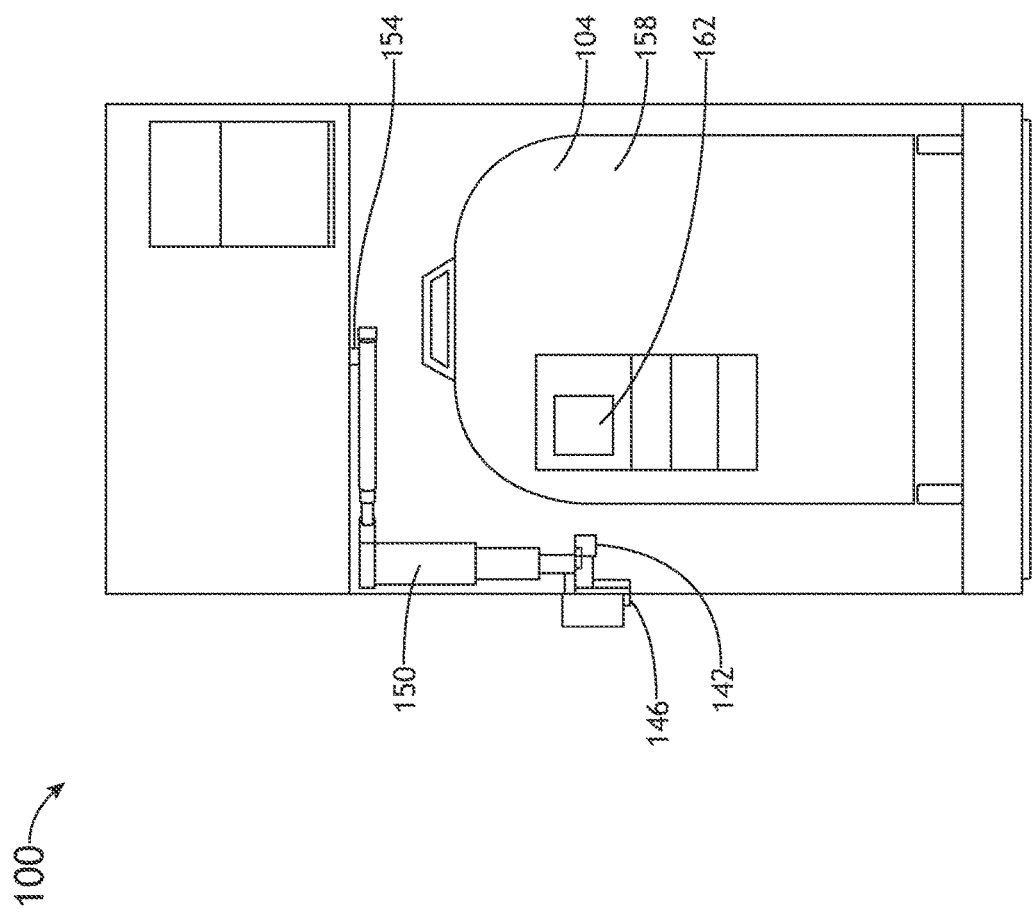
FIG. 1F is a diagram illustrating a front view of a baggage labeling system, in accordance with one or more embodiments of this disclosure.

FIG. 1F illustrates a front side view of the baggage labeling module 102 post printing, in accordance with one or more embodiments of this disclosure. Here, the optical scanner 146 identified a printable surface 158 on the baggage item 104 and has printed a baggage label 162 (e.g., a baggage tag that includes an IATA airport code) onto the printable surface 158. The rotation of the positioning arm 150 via the positioning arm motor facilitates this process.

The ink may be any type of ink or paint known. For example, the ink may be a removable ink or removeable paint. For instance, the ink or paint may be a peelable ink or paint that can be removed without marring the surface of the baggage item 104. Peelable inks or paints include but are not limited to latex-based paints and rubber-based paint. In some embodiments, the baggage labeling module 102 may comprise two or more inks. For example, the baggage labeling module 102 may apply a base paint layer onto the surface of the baggage item 104 that provides a substrate for a second ink, which is used to print the necessary information onto the base paint layer. The base paint layer may be a rubber or latex based paint that is peelable.

FIG. 1G is a drawing illustrating the positioning arm 150 in accordance with one or more embodiments of this disclosure. In some embodiments the positioning arm 150 includes a first operating member 166 configured to move the printer head 142 relative a second axis. The first operating member 166 may be any type of translating, rotating or articulating member. For example, the first operating member 166 may be configured as a telescoping member that extends or retracts the printer head horizontally in relation to the baggage handling system 100. For instance, the first operating member 166 may telescopically extend horizontally outward from the baggage labeling module 102 in order to scan a bag having a large girth or width. The first operating member 166 is powered by a first operating member motor mechanically coupled to the first operating member.

In some embodiments, the positioning arm 150 includes a second operating member 174 configured to move the printer head 142 relative a third axis (e.g., a different axis than the first operating member 166). For example, the first operating member 166 may translate along an X-axis, the second operating member 174 may translate along a Y-axis. For which a translation or rotation of the positioning arm 150 itself may allow the printer head to be positioned within any working space in the baggage labeling module 102. The second operating member 174 may be any type of translating, rotating, or articulating member. For example, the second operating member 174 may be configured as a telescoping member that extends the printed head vertically in relation to the baggage handling system 100. For example, the second operating member may extend vertically downward in order to scan baggage having a small height (e.g., less than 15 cm). The second operating member is powered by second operating member motor mechanically coupled to the second operating member. The positioning arm 150 may include more operating members as needed for scanning and printing.

FIG. 1H illustrates the printer head 142 mechanically coupled to the second operating member 174 in accordance with one or more embodiments of this disclosure. In some embodiments, the printer head 142 is adjustable along one or more axes relative to the positioning arm 150 and/or the second operating member 174. For example, the guide bar 176 mechanically coupled to the printer head 142 may itself be mechanically coupled to the second operating member 174 via a first revolving joint 178 that allows the rotation of the printer head 142 at a right angle relative to the second operating member 174. In another example, the printer head 142 may itself be configured to rotate relative to the guide bar 176 via a second revolving joint 182. Any type of mechanical joints may be used to for adjustment of the printer head 142 relative to the second operating member 174 or positioning arm 150. These first revolving joint 178 or second revolving joint 182 may be adjusted manually (e.g., by hand) or automatically (e.g., via a motor/controller). In this manner, the positioning arm has the degrees of freedom necessary to effectively print the label on most any lateral surface of the baggage item 104.

Figure 2B:
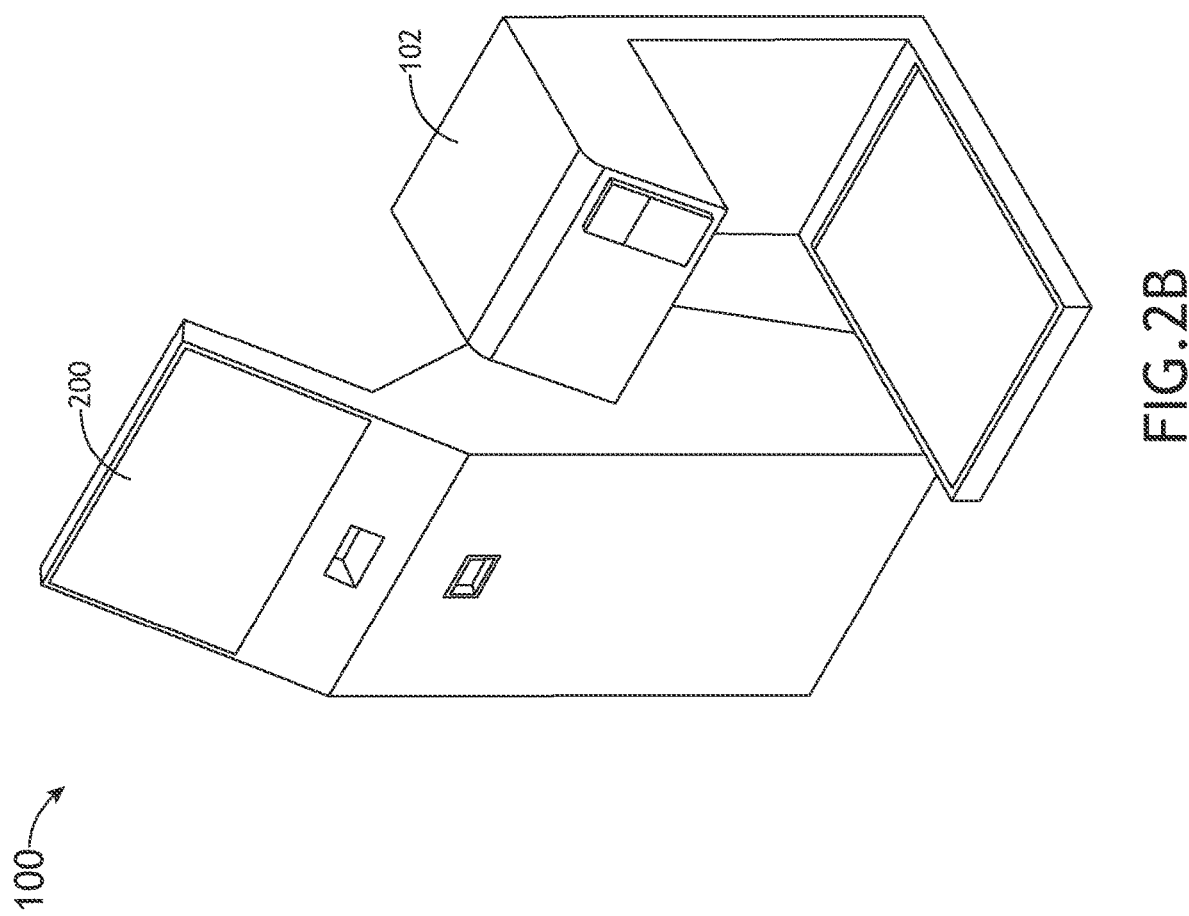
FIG. 2B illustrates a perspective view of a workstation coupled to a baggage labeling system, in accordance with one or more embodiments of this disclosure.

FIG. 2A-B illustrates a perspective view of a workstation 200, in accordance with one or more embodiments of this disclosure. In some embodiments, the baggage labeling system 100 includes, or is communicatively coupled to, the workstation 200. For example, the baggage labeling system 100 may include a workstation 200 configured as a ticket printing kiosk in an airport terminal that has been retrofitted to include the baggage labeling module 102. For instance, the baggage labeling system 100 may include a baggage labeling module 102 that is adjacent to and communicatively couple to the workstation 200, as in FIG. 2B. In another example, the baggage labeling system 100 may include a workstation 200 combined with the baggage labeling system 100 as a complete self-check-in baggage station at an aircraft terminal (e.g., the workstation 200 and baggage labeling module 102 are originally manufactured as a combined unit). In another example, the baggage labeling system may include a workstation 200 configured as an attendant check-in station that has been retrofitted to include the baggage labeling system 100. In another example, the baggage labeling system 100 may include a workstation configured with the baggage labeling system 100 as a complete attendant check-in baggage station at an aircraft terminal (e.g., the workstation 200 and baggage labeling module 102 are originally manufactured as a combined unit). The workstation 200 may communicate with the baggage labeling module 102 via a workstation interface 202. The workstation 200 may communicate with the baggage labeling module 102 via any wireless or wireline technology. For example, the workstation 200 may communicatively connect to the baggage labeling module via Bluetooth, BLW, WIFI, Zig-Bee, or WiMAX wireless technology.

In embodiments, the workstation 200 includes a user interface 204 configured to receive and/or transmit destination or baggage-related information. For example, the user interface 204 may be used to input boarding pass information or other identification, with a portion of that information or other data linked to the inputted data to be printed onto the baggage item 104. The user interface 204 may include any device capable of relaying information between a user and the workstation 200 and/or baggage handling system 100. For example, the user interface may include a display 206. For instance, the user interface 204 may include a touch-sensitive display, allowing the traveler or attendant to enter information regarding the traveler and/or baggage item. In another example, the user interface 204 may include a keyboard. In another example, the user interface 204 may include a speaker and/or microphone.

In some embodiments, the workstation 200 includes a reader 208 configured to scan information and input that information into the workstation 200. The reader 208 may be configured as any reading or scanning device including but not limited to a barcode reader, a QR code reader, or a document scanner. For example, the reader 208 may be configured as a QR code reader that scans boarding pass QR codes from a mobile phone. In another example, the reader 208 may be configured as a document scanner that can scan a paper boarding pass and/or a personal identification card (e.g., a driver's license identification card).

In some embodiments, the workstation 200 includes one or more printers 212 configured to print boarding passes, travel documentation and/or baggage tags. For example, the printer 212 may print a baggage tag if the printer head 142 is temporarily inoperable.

Figure 3A:
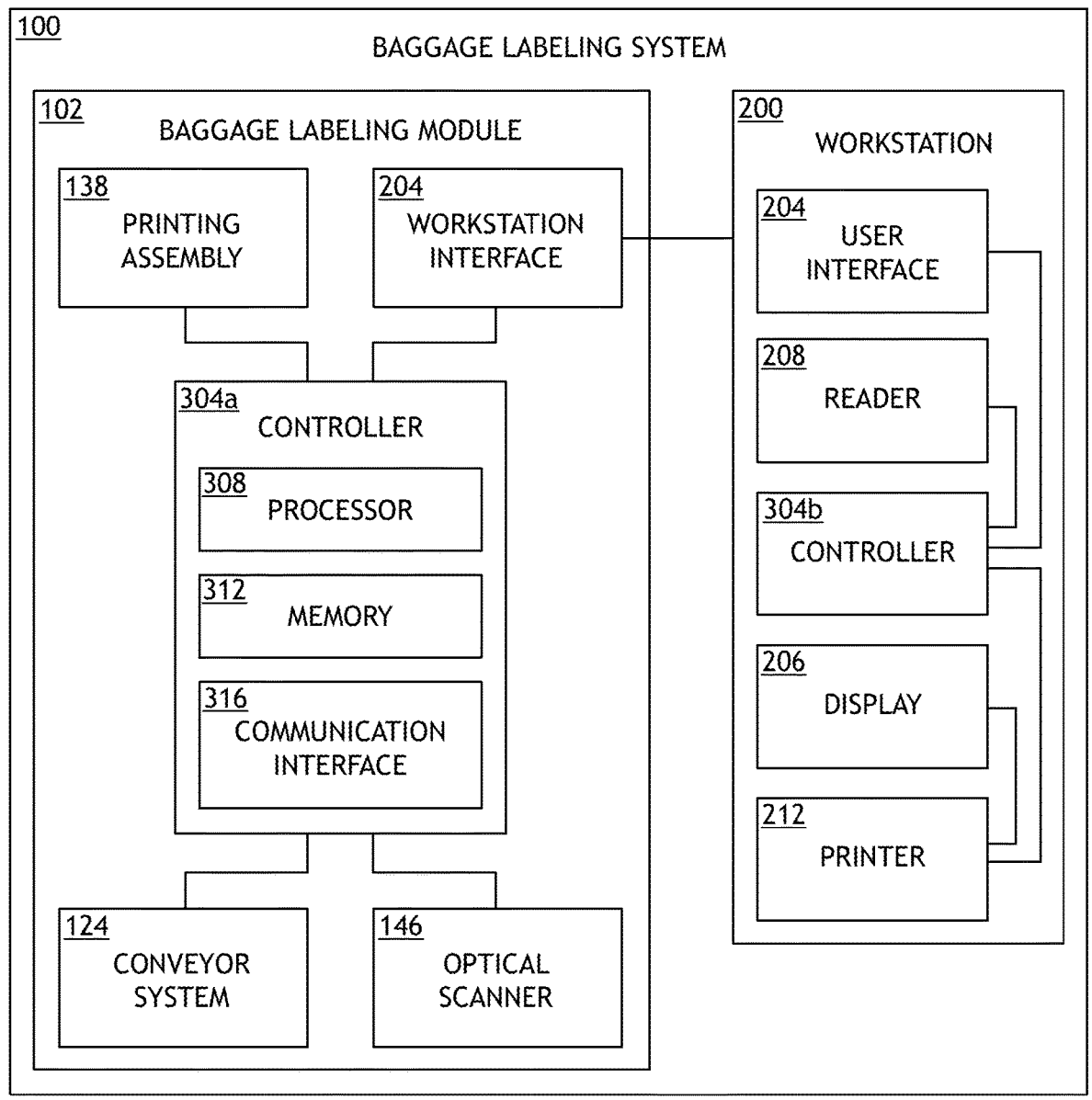
FIG. 3A-C are block diagrams illustrating a baggage labeling system, in accordance with one or more embodiments of this disclosure.
Figure 3B:
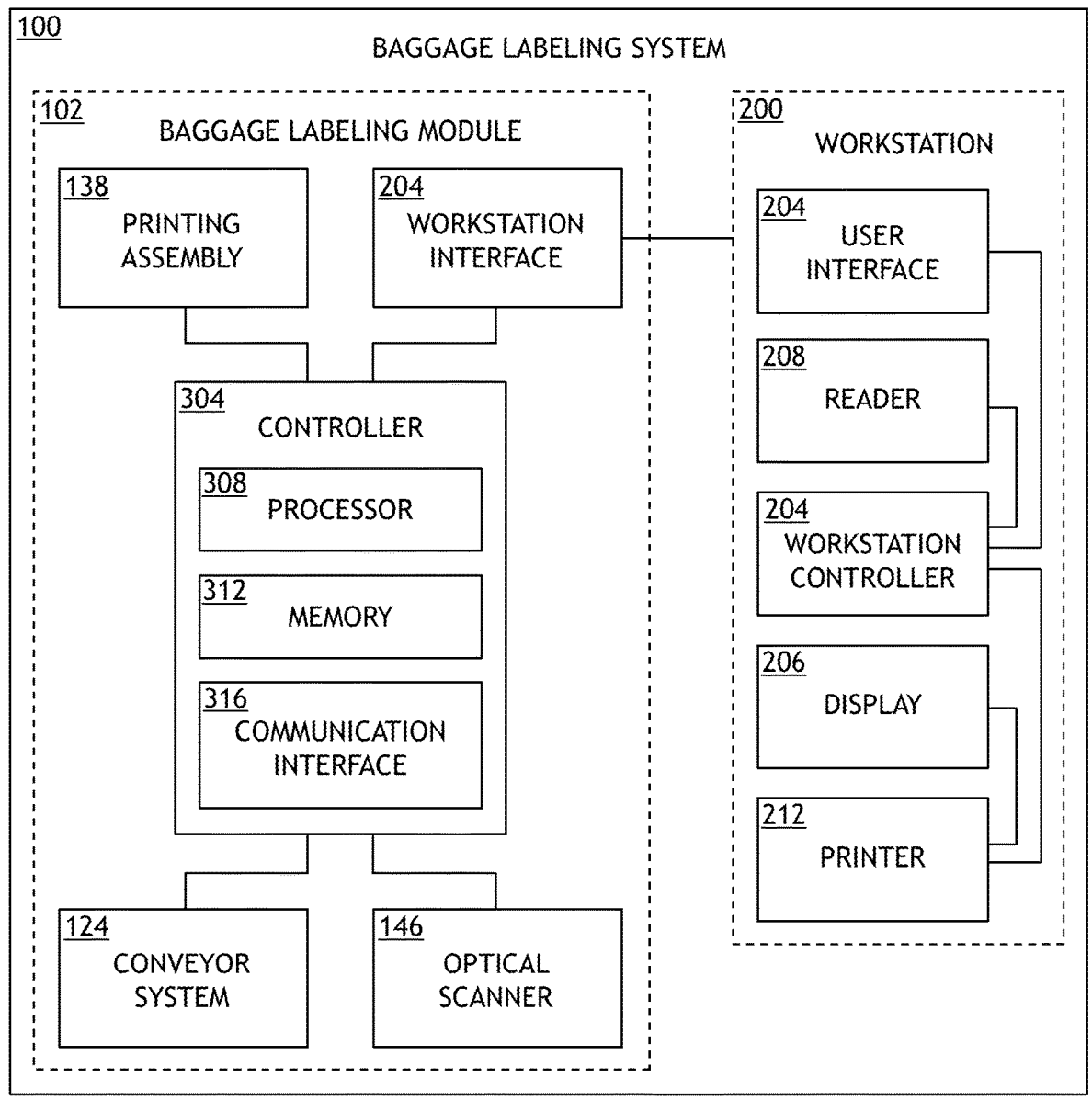
Figure 3C:
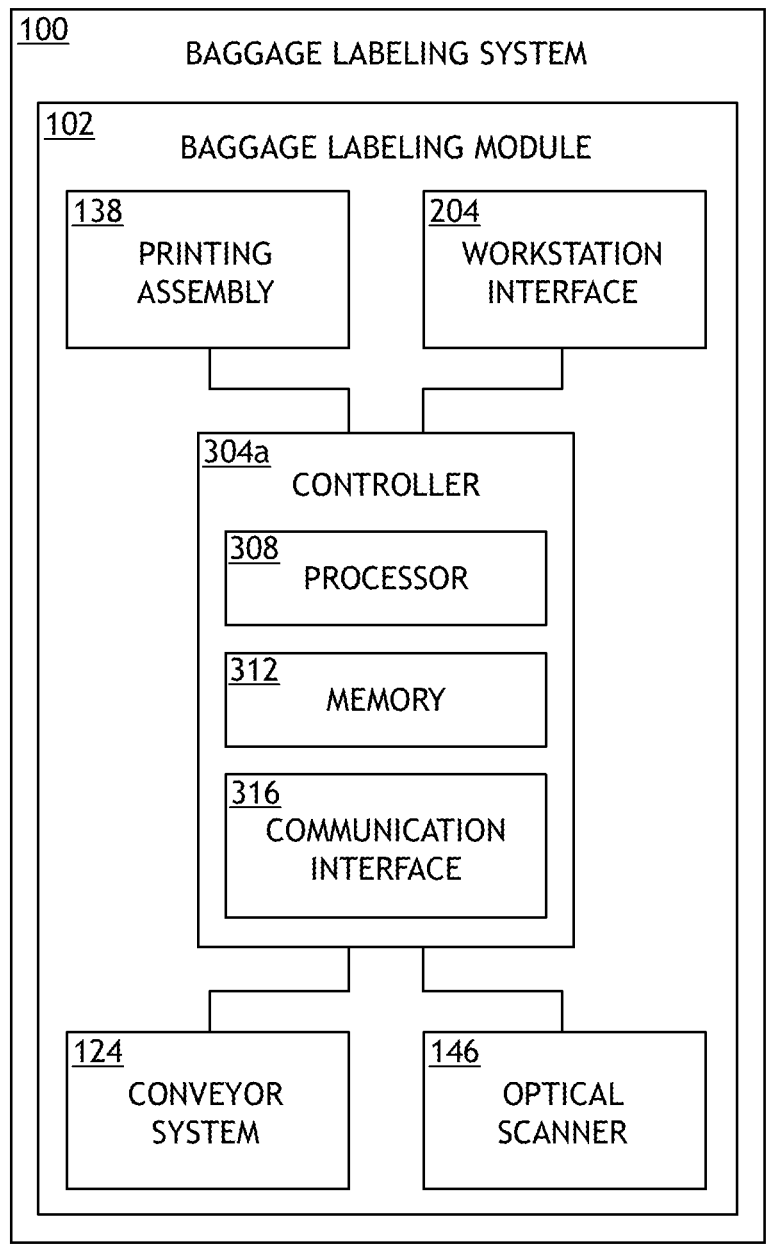

FIG. 3A-C are block diagrams illustrating a baggage labeling system 100, in accordance with one or more embodiments of this disclosure. The baggage labeling system may have one or many different configurations. For example, the baggage labeling system 100 may be configured as a baggage labeling module 102 and workstation 200 physically or substantially separated into separate modules linked by a workstation interface 204 (e.g., as in FIG. 3A). In another example, the baggage labeling system 100 may physically combined into a single module that includes the baggage labeling module 102 and the workstation 200 (e.g., as in FIG. 3B). In another example, the baggage handling system 100 only contains the baggage handling module (e.g., as in FIG. 3C).

In embodiments, the baggage labeling system 100 includes one or more controllers 304a, 304b communicatively coupled to other components within the baggage labeling system 100. For example, the workstation 200 and/or the baggage labeling module 102 may include at least one of the one or more controllers 304a, 304b (e.g., the baggage labeling module 102 having one or more controllers 304a and the workstation 200 having one or more controllers 304b). In another example, wherein the workstation and baggage labeling module 102 are combined, the workstation 200 and the baggage handling module 102 may share at least one of the one or more controllers 304a, 304b. The one or more controllers 304a, 304b may include one or more processors 308, memory 312, and a communication interface 316. The memory 312 may store (e.g., have stored upon) one or more sets of program instructions. The one or more processors 308 may be configured to execute the one or more sets of program instructions to carry out one or more of the various steps described throughout the present disclosure. For example, the one or more processor 308 may be instructed to receive an input from the user interface 204 and/or the reader 208. In another example, the one or more processors may be instructed to send a printing instruction to the baggage labeling module (e.g., to the printer head).

In some embodiments, one or more of the one or more controllers 304a, 304b are communicatively coupled to the printing assembly 138 and related componentry. For example, one or more of the one or more controllers 304a, 304b may be communicatively coupled to the optical scanner 146, the printer head 142, the positioning arm 150 (e.g., via the positioning arm motor), the first operating member 166 (e.g., via the first operating member motor), the second operating member 174 (e.g., via the second operating member motor), the first revolving joint 178 and/or the second operating joint. One or more of the one or more controllers 304a, 304b may also be communicatively coupled to the conveyor system 128 (via the conveyor actuating motor). One or more or the one or more controllers 304a, 304b may be communicatively coupled to the workstation and/or one or more components of the workstation including the user interface 204, the reader 208, the display 206, and the one or more printers 212. The one or more controllers may also be communicatively coupled to the one or more baggage sensors (e.g., the optical sensor and/or weighing scale). The one or more controllers 304a, 304b may also be communicatively coupled to other componentry within the baggage label system 100 not listed here. Therefore, the above description should not be interpreted as a limitation of the present disclosure, but as an illustration.

The one or more processors 308 may include any one or more processing elements known in the art. In this sense, the one or more processors 308 may include any microprocessor device configured to execute algorithms and/or program instructions. In general, the term "processor" may be broadly defined to encompass any device having one or more processing elements, which execute a set of program instructions from a non-transitory memory medium (e.g., the memory 312), where the one or more sets of program instructions is configured to cause the one or more processors 308 to carry out any of one or more process steps.

The memory 312 may include any storage medium known in the art suitable for storing the one or more sets of program instructions executable by the associated one or more processors 308. For example, the memory 312 may include a non-transitory memory medium. For instance, the memory 312 may include, but is not limited to, a read-only memory (ROM), a random-access memory (RAM), a magnetic or optical memory device (e.g., disk), a magnetic tape, a solid-state drive, and the like. The memory 312 may be configured to provide display information to the display 123. In addition, the memory 312 may be configured to store user input information. The memory 312 may be housed in a common controller housing with the one or more processors 308. The memory 312 may, alternatively or in addition, be located remotely with respect to the spatial location of the processors 308, or the one or more controllers 304a, 304b. For example, the one or more processors 308 and/or one or more controllers 304a, 304b may access a remote memory 312 accessible through a network (e.g., wireless, and the like) via one or more communication interfaces 316.

The one or more communication interfaces 316 may be operatively configured to communicate with components of the one or more controllers 314. For example, the one or more communication interfaces 316 may be configured to retrieve data from the one or more processors 308 or other devices, transmit data for storage in the memory 312, retrieve data from storage in the memory 312, and so forth. The one or more communication interfaces 316 may also be communicatively coupled with the one or more processors 308 to facilitate data transfer between components of the one or more controllers 304a, 304b and the one or more processors 308. It should be noted that while the one or more communication interfaces 316 is described as a component of the one or more controllers 304a, 304b, one or more components of the one or more communication interfaces 316 may be implemented as external components communicatively coupled to the one or more controllers 304 via a wired and/or wireless connection. The one or more controllers 304a, 304b may also include and/or connect to one or more user interfaces 204 (e.g., display 123).

Figure 4:
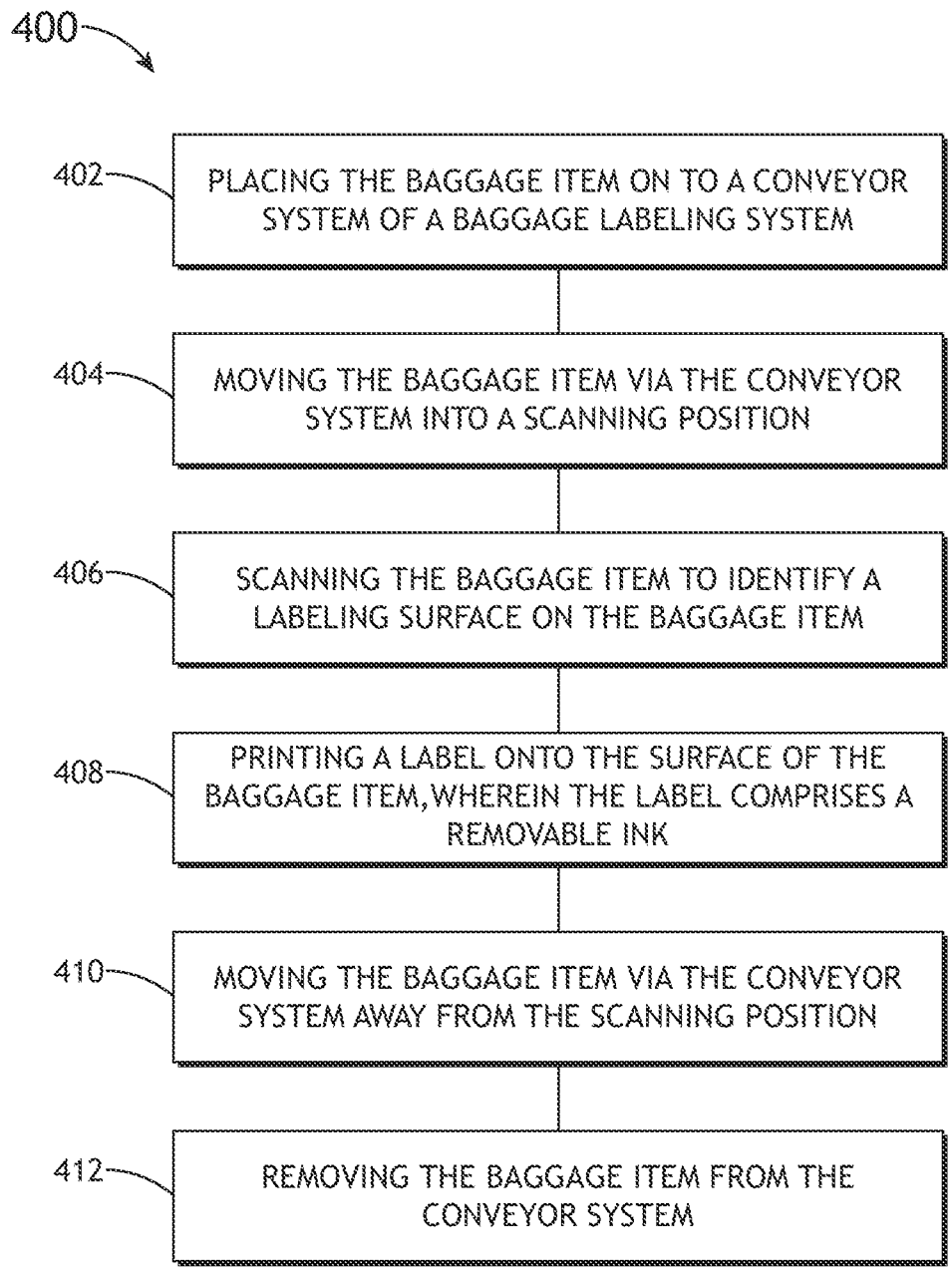
FIG. 4 illustrates a method for printing a label onto a baggage item, in accordance with one or more embodiments of this disclosure.

FIG. 4 illustrates a method 400 for printing a label onto a baggage item, in accordance with one or more embodiments of this disclosure. The label comprises travel and/or baggage information that has been inputted into the workstation 200. In embodiments, the method 400 includes a step 402 of placing the baggage item 104 onto the conveyor system 128 of the baggage labeling system 100.

In embodiments, the method 400 includes a step 404 of moving the baggage item 104 via the conveyor system 124 into a scanning position. For example, the weighing scale (e.g., a load cell) or other baggage sensor may detect the baggage item on the conveyor system 124, signaling to the conveyor belt actuating motor to actuate, moving the baggage item 104 to the scanning position.

In embodiments, the method 400 includes a step 406 of scanning the baggage item to identify a labeling surface on the baggage item. For example, the optical scanner 146, attached to the end of the positioning arm 150 may scan the surface area of the baggage item 104 as the positioning arm 150 rotates. Information from the optical scanner is analyzed by the one or more processors 308 using image processing technology to determine putative labeling surfaces.

In embodiments, the method 400 includes a step 408 of printing a label onto the labeling surface of the baggage item 104. Once the labeling area has been determined, the one or more processors 308 actuates the positioning arm 150, which places the printing head 142 in the position necessary to print the label onto the labeling surface. The printing head 142 then prints the ink directly onto the surface of the baggage item 104.

In embodiments, the method 400 includes a step 410 of moving the baggage item 104 via the conveyor system 124 away from the scanning position. For example, once the printing head 142 has finished printing the travel information on the baggage item 104, the positioning arm 150 retracts to a home position, and a signal is sent to the conveyor belt actuating motor (e.g., via the one or more processors 308) to return the baggage item 104 to the original position (e.g., the position where the baggage item 104 was initially placed on the conveyor system 124. In embodiments, the method includes a step 412 of removing the baggage item 104 from the conveyor system 124.

In some embodiments, the baggage handling system 100 includes a sterilization module configured to reduce viruses, bacteria, or other microbes. Any type of sterilization technology may be utilized. For example, the baggage labeling system may include an ultraviolet light source. For instance, the ultraviolet light source may be configured to illuminate a surface of the baggage item 104, sterilizing that area of the baggage item 104.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. A baggage labeling system comprising:
 a baggage labeling module comprising:
  a housing;
  a workstation interface;
  a controller communicatively coupled to the workstation interface;
  a baggage sensor communicatively coupled to the controller;
  a conveyor system communicatively coupled to the controller and configured to move a baggage item comprising:
   a conveyor belt; and
   a conveyor actuating motor;
  an optical scanner communicatively coupled to the controller, wherein the optical scanner is configured to scan at least one surface of the baggage item;
  a printing assembly communicatively coupled to the controller comprising:
   a printer head configured to print a base peelable ink layer directly onto the baggage item and configured to print a second ink layer directly on the base peelable ink layer, wherein the base peelable ink layer and the second ink layer define a label;
   a positioning arm mechanically coupled to the printer head; and
   a positioning arm motor mechanically coupled to the positioning arm, wherein the positioning arm is configured to at least one of:
    rotate the positioning arm relative to at least one plane; or;
    translate the positioning arm relative to a first axis.

2. The baggage labeling system of claim 1, further comprising a workstation communicatively coupled to the baggage labeling module comprising:
 a display;
 a user interface;
 a reader configured to detect and input baggage-related data;

one or more processors communicatively coupled to the workstation interface, the display, the user interface and the reader; and
a memory communicatively coupled to the one or more processors and having instructions stored upon, which when executed by the one or more processors, cause the one or more processors to:
receive an input from at least one of the user interface or the reader; and
send a printing instruction to the baggage labeling module.

3. The baggage labeling system of claim 1, wherein the positioning arm comprises:
a first operating member; and
a first operating member motor mechanically coupled to the first operating member and communicatively coupled to the controller, wherein the first operating member is configured to move the printer head relative to a second axis.

4. The baggage labeling system of claim 3, further comprising:
a second operating member; and
a second operating member motor mechanically coupled to the second operating member and communicatively coupled to the controller, wherein the second operating member is configured to move the printer head relative to a third axis.

5. The baggage labeling system of claim 1, wherein the optical scanner is mechanically coupled to the printer head.

6. The baggage labeling system of claim 1, further comprising a peelable ink configured to be printed onto the baggage item via the printer head.

7. The baggage labeling system of claim 2, wherein the baggage labeling module communicates with the workstation via a wireless technology.

8. The baggage labeling system of claim 1, further comprising an ultraviolet light source configured to sterilize at least a portion of the baggage item.

9. The baggage system of claim 2, wherein the one or more processors are further instructed to determine a labeling surface on the baggage item to print the label.

10. A baggage labeling system comprising:
a baggage labeling module comprising:
a housing;
a workstation interface;
a controller communicatively coupled to the workstation interface;
a baggage sensor communicatively coupled to the controller;
a conveyor system communicatively coupled to the controller and configured to translate a baggage item comprising:
a conveyor belt; and
a conveyor belt actuating motor;
an optical scanner communicatively coupled to the controller, wherein the optical scanner is configured to scan at least one surface of the baggage item;
a printing assembly comprising:
a printer head communicatively coupled to the controller, wherein the printer head is configured to print a base peelable ink layer directly onto the baggage item and configured to print a second ink layer directly on the base peelable ink layer, wherein the base peelable ink layer and the second ink layer define a label;
a positioning arm mechanically coupled to the printer head; and
a positioning arm motor communicatively coupled to the controller and mechanically coupled to the positioning arm, wherein the positioning arm is configured to at least one of:
rotate the positioning arm relative to at least one plane; or;
translate the positioning arm relative to a first axis; and
a workstation communicatively coupled to the baggage labeling module comprising:
a display;
a user interface;
a reader configured to detect and input baggage-related data; and
one or more processors communicatively coupled to the communication interface, the display, the user interface and the reader;
a memory coupled to the one or more processors and having instructions stored upon, which when executed by the one or more processors, causing the one or more processors to:
receive an input from at least one of the user interface or barcode scanner; and
send a printing instruction to the baggage labeling module via the communication interface.

11. The baggage labeling system of claim 10, wherein the positioning arm comprises:
a first operating member; and
a first operating member motor mechanically coupled to the first operating member and communicatively coupled to the controller, wherein the first operating member is configured to translate the printer head to a second axis.

12. The baggage labeling system of claim 11, wherein the positioning arm comprises:
a second operating member; and
a second operating member motor mechanically coupled to the second operating member and communicatively coupled to the controller, wherein the second operating member is configured to translate the printer head relative to a third axis.

13. The baggage labeling system of claim 10, wherein the optical scanner is mechanically coupled to the printer head.

14. The baggage labeling system of claim 10, further comprising a peelable ink configured to be printed onto the baggage item via the printer head.

15. The baggage labeling system of claim 10, wherein the baggage labeling module communicates with the workstation via a wireless technology.

16. The baggage labeling system of claim 10, further comprising an ultraviolet light configured to sterilize at least a portion of the baggage item.

17. The baggage system of claim 10, wherein the one or more processors are further instructed to determine a labeling surface on the baggage item to print the label.

18. A method for labeling a baggage item comprising:
placing the baggage item onto a conveyor system of a baggage labeling system;
moving the baggage item via the conveyor system into a scanning position;
scanning the baggage item to identify a labeling surface on the baggage item;
printing a base peelable ink layer directly onto the labeling surface of the baggage item using a peelable ink;
printing a second ink layer directly on the base peelable ink layer wherein the base peelable ink layer and the second ink layer define a label;

moving the baggage item via the conveyor system away from the scanning position; and
removing the baggage item from the conveyor system.

* * * * *